(12) United States Patent
Richards et al.

(10) Patent No.: US 10,565,941 B1
(45) Date of Patent: Feb. 18, 2020

(54) DISPLAY PANEL WITH INACTIVE REGION USED IN A HEAD MOUNTED DISPLAY

(71) Applicant: Facebook Technologies, LLC, Menlo Park, CA (US)

(72) Inventors: Evan M. Richards, Santa Clara, CA (US); Cheonhong Kim, Mountain View, CA (US); Nirav Rajendra Patel, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 23 days.

(21) Appl. No.: 15/895,835

(22) Filed: Feb. 13, 2018

Related U.S. Application Data

(60) Provisional application No. 62/459,022, filed on Feb. 14, 2017.

(51) Int. Cl.
*G09G 3/34* (2006.01)
*G02B 7/12* (2006.01)
*G02B 27/00* (2006.01)
*G02B 27/01* (2006.01)

(52) U.S. Cl.
CPC ............. *G09G 3/3426* (2013.01); *G02B 7/12* (2013.01); *G02B 27/0172* (2013.01); *G09G 2320/0686* (2013.01)

(58) Field of Classification Search
CPC ......... G09G 3/3426; G09G 2320/0686; G02B 27/0172; G02B 7/12
See application file for complete search history.

(56) References Cited

U.S. PATENT DOCUMENTS

| 5,488,508 | A | * | 1/1996 | Haseltine | G02B 27/0172 359/227 |
| 2001/0054989 | A1 | * | 12/2001 | Zavracky | G02B 27/017 345/8 |
| 2009/0073386 | A1 | * | 3/2009 | Petito | G02B 27/0172 351/243 |
| 2014/0104142 | A1 | * | 4/2014 | Bickerstaff | G02B 27/017 345/8 |
| 2017/0228938 | A1 | * | 8/2017 | Fateh | G06F 3/147 |

* cited by examiner

*Primary Examiner* — Ryan A Lubit
(74) *Attorney, Agent, or Firm* — Fenwick & West LLP

(57) ABSTRACT

An electronic display includes a display panel that operates in a single display mode to provide a single display, or a dual display mode to provide two displays separated by an inactive region. The electronic display includes the display panel and a panel driver. The display panel includes a left pixel region, a right pixel region, and a middle pixel region between the left and right pixel regions. In the single display mode of the electronic display, the panel driver provides first gate signals generated from first input data to the left, right, and middle pixel regions. In a dual display mode, the panel driver provides second gate signals generated from second input data to the left and right pixel regions. The first input data has a first resolution that is larger than a second resolution of the second input data.

20 Claims, 13 Drawing Sheets

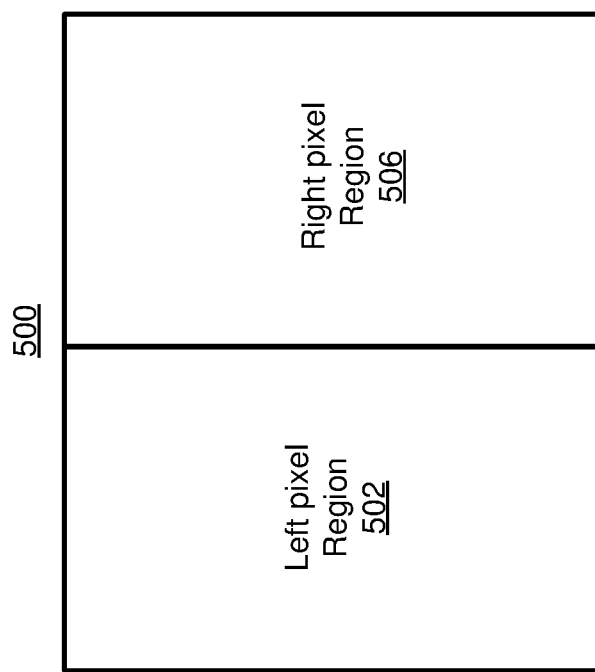

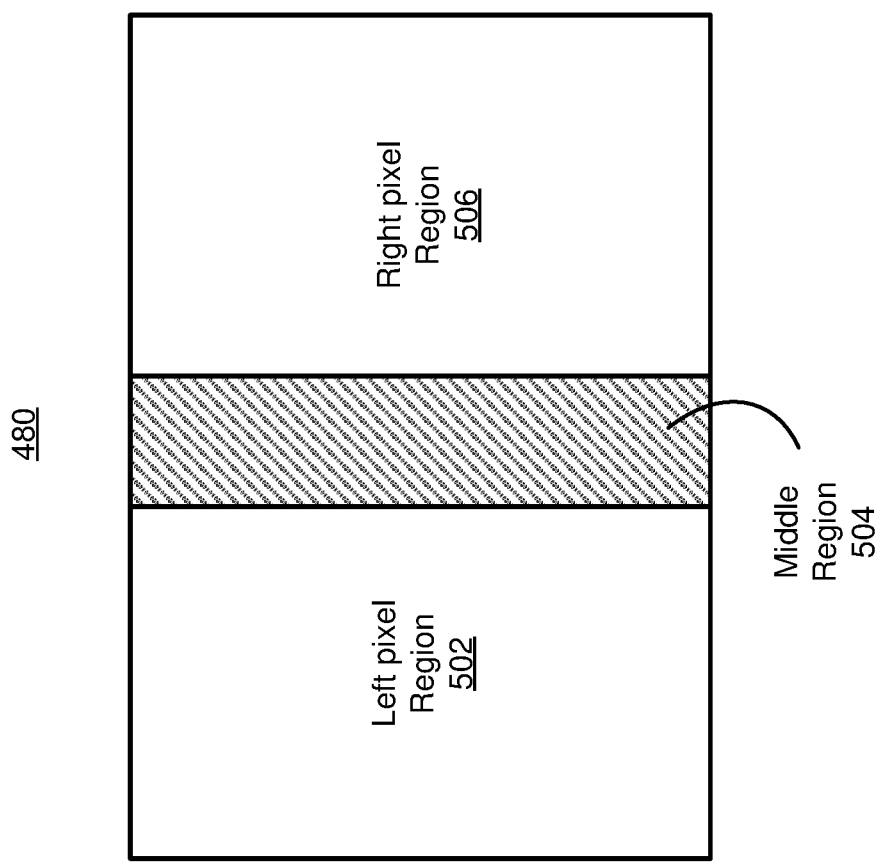

United States Patent US 10,565,941 B1

DISPLAY PANEL WITH INACTIVE REGION USED IN A HEAD MOUNTED DISPLAY

CROSS REFERENCE TO RELATED APPLICATION

This application claims the benefit of U.S. Provisional Patent Application No. 62/459,022, filed Feb. 14, 2017, which is incorporated by reference herein in its entirety.

BACKGROUND

The present disclosure generally relates to display panels, and specifically to display panels for head-mounted displays (HMDs).

HMD's generate displays having different left and right channels for a viewer's left eye and right eye. Because of bandwidth limitations and the high frame rates that are desirable for HMDs, two separate electronic displays are typically used to provide the left and right channels. Each electronic display has separate sets of hardware, such as panel drivers that drive transistors of the display panel for pixel control.

SUMMARY

An electronic display includes a display panel that operates in a single display mode to provide a single display, or a dual display mode to provide two displays separated by an inactive region. The electronic display includes the display panel and a panel driver. The display panel includes a left pixel region, a right pixel region, and a middle pixel region between the left and right pixel regions. In the single display mode of the electronic display, the panel driver provides first gate signals generated from first input data to the left, right, and middle pixel regions. In a dual display mode, the panel driver provides second gate signals generated from second input data to the left and right pixel regions. The first input data has a first resolution that is larger than a second resolution of the second input data.

In some embodiments, the electric display includes a single display mode shift register coupled to the panel driver and pixel lines of the left, right, and middle pixel regions, the single display mode shift register configured to provide the first gate signals from the panel driver to the pixel lines of the left, right, and middle pixel regions in the single display mode of the electronic display.

In some embodiments, the electronic display includes a dual display mode shift register coupled to the panel driver and pixel lines of the left and right pixel regions, the dual display mode shift register configured to provide the second gate signals from the panel driver to the pixel lines of the left and right pixel regions in the dual display mode of the electronic display.

In some embodiments, the dual display mode includes a narrow interpupillary distance (IPD) dual display mode and a wide IPD dual display mode. the electronic display further includes: a narrow IPD shift register coupled to the panel driver and a first set of pixel lines of a narrow IPD left pixel region of the left pixel region and a narrow IPD right pixel region of the right pixel region, the narrow IPD shift register configured to provide the second gate signals from the panel driver to the first set of pixel lines of the narrow IPD left pixel region and the narrow IPD right pixel region in the narrow IPD dual display mode of the electronic display; and a wide IPD shift register coupled to the panel driver and a second set of pixel lines of a wide IPD left pixel region of the left pixel region and a wide IPD right pixel region of the right pixel region, the wide IPD shift register configured to provide the second gate signals from the panel driver to the second set of pixel lines of the wide IPD left pixel region and the wide IPD right pixel region in the wide IPD dual display mode of the electronic display.

In some embodiments, the electronic display is located in a head-mounted display (HMD). The HMD includes a first optics block positioned to receive first light from the left pixel region and a second optics block positioned to receive second light from the right pixel region. In some embodiments, a system includes the electronic display and a console that generates input data for the electronic display. The console may be integrated with the electronic display, such as in an HMD, or separate from the electronic display.

Some embodiments include an electronic display including a single display panel having an inactive middle region. The electronic display includes a display panel and a panel driver. The display panel has a pixel layer defining a left pixel region, a middle pixel region, and a right pixel region. A TFT layer with source lines and gate lines is connected with transistors of the TFT layer at the left and right pixel regions, but not the middle pixel region. This results in the middle pixel region being an inactive region that is not driven by the source driver IC.

BRIEF DESCRIPTION OF THE DRAWINGS

FIG. 5A shows an example video frame of input data for the display panel, in accordance with some embodiments.

FIG. 5B shows an output of the display panel in dual display mode for the video frame of input data shown in FIG. 5A, in accordance with some embodiments.

Figure 1:
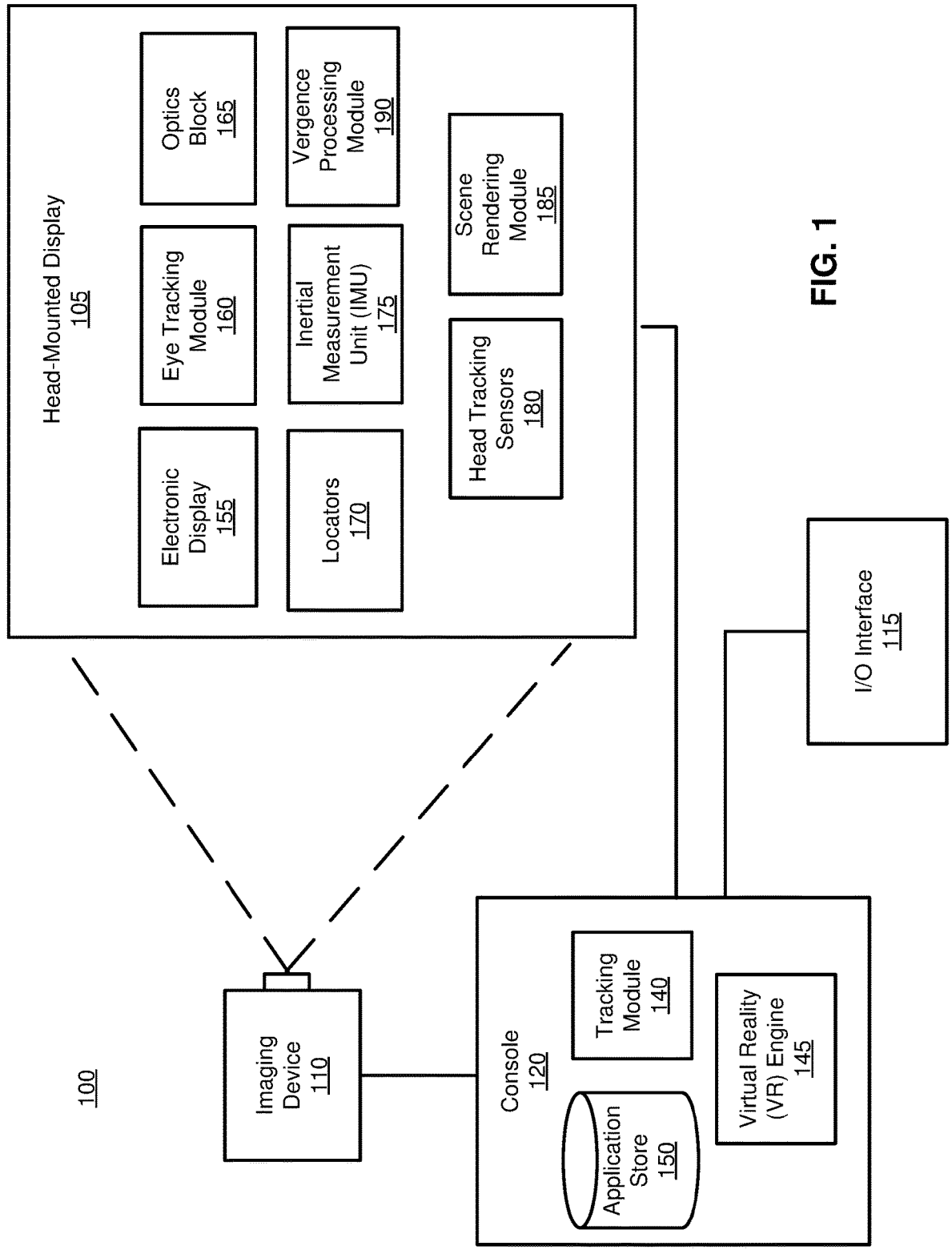
FIG. 1 shows a system, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

An electronic display operates in a single display mode or a dual display mode. In the dual display mode, the electronic display can provide binocular video displays to a user wearing an HMD including the electronic display. For example, the electronic display may include a display panel including a left pixel region, a right pixel region, and a middle pixel region. A panel driver is coupled to the display panel. In a single display mode of the electronic display, the panel driver provides gate signals generated from input data of a higher resolution to the left, right, and middle pixel regions. In a dual display mode of the electronic display, the panel driver provides gate signals generated from input data of a lower resolution to the left and right pixel regions. In some embodiments, the dual display mode includes a narrow interpupillary distance (IPD) dual display mode and a wide IPD dual display mode that provide binocular displays with different spatial separation. Here, the dual display mode can accommodate variance in user IPD.

In some embodiments, the middle pixel region is an inactive region that is not connected to gate signals from the panel driver. Here, the electronic display provides a binocular display using a single display panel.

When the middle region is inactive or otherwise not used (e.g., in a dual display mode), the electronic display can receive smaller resolution frames of input data that includes pixel data for only the left and right pixel regions (e.g., rather than including black pixel data for pixels of the middle pixel region). As such, the bandwidth needed to send video frames from a processor to the electronic display of the HMD can be reduced. Furthermore, a single display panel can be used to provide binocular displays in the HMD which can reduce the number of components and manufacturing costs.

Embodiments discussed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

System Overview

FIG. 1 shows a system 100 including a head-mounted display (HMD). The system 100 may be for use as an artificial reality system. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

As discussed in further detail below, the electronic display 155 provides a display of gaze contingent content concurrent with eye position detection. The detection of eye tracking information is used as an input to generate (e.g., a subsequent video frame) of gaze contingent content. The electronic display 155 includes a display panel having a substrate, and visible LEDs and light detectors positioned on a surface of the substrate.

The optics block 165 adjusts its focal length responsive to instructions from the console 120. In some embodiments, the optics block 165 includes a multi multifocal block to adjust a focal length (adjusts optical power) of the optics block 165.

The eye tracking module 160 tracks an eye position and eye movement of a user of the HMD 105. The light detectors of the electronic display 155 (e.g., or elsewhere in the HMD 105) capture image information of a user's eyes, and the eye tracking module 160 uses the captured information to determine eye tracking information such as interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g., information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane. The VR engine 145 uses the focal information to determine settings for one or more SHWPs, one or more active liquid crystal lenses, or some combination thereof, within the optics block 165 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
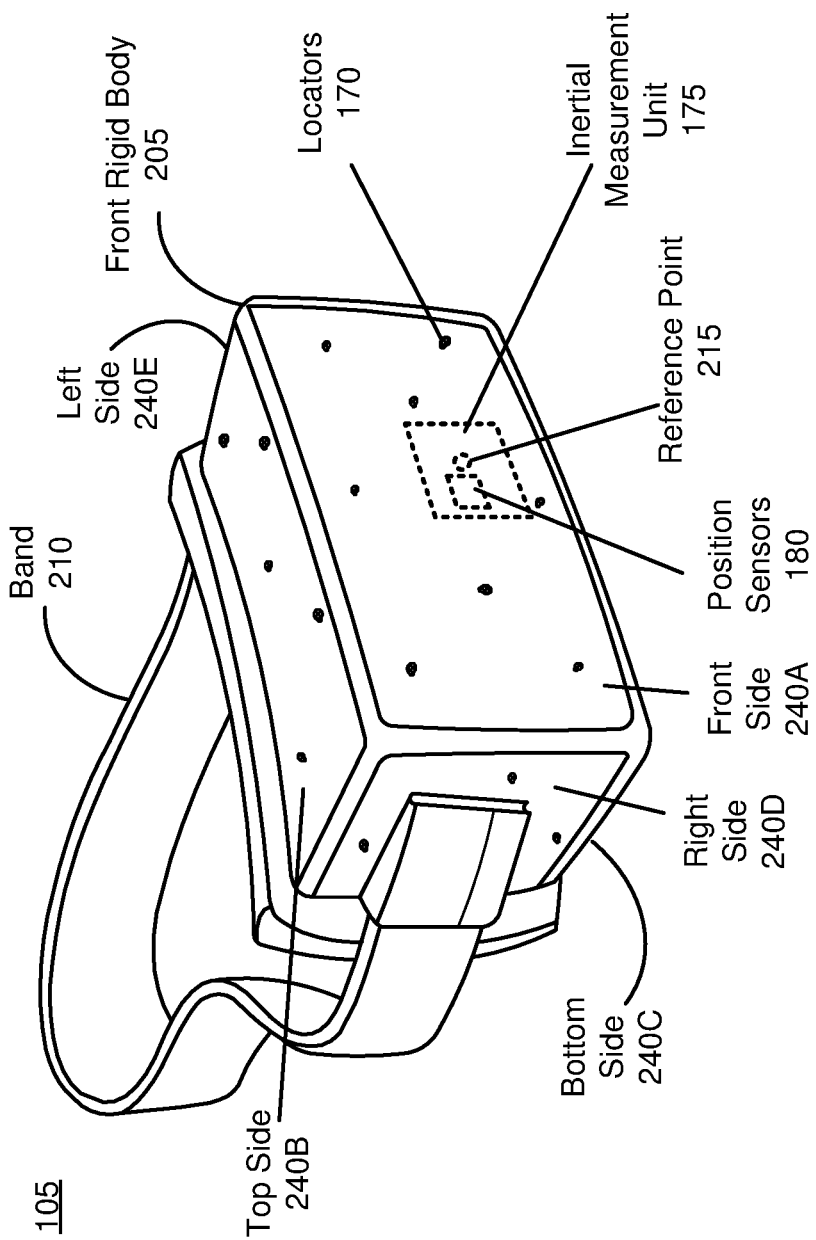
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 105 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 17 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 170 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
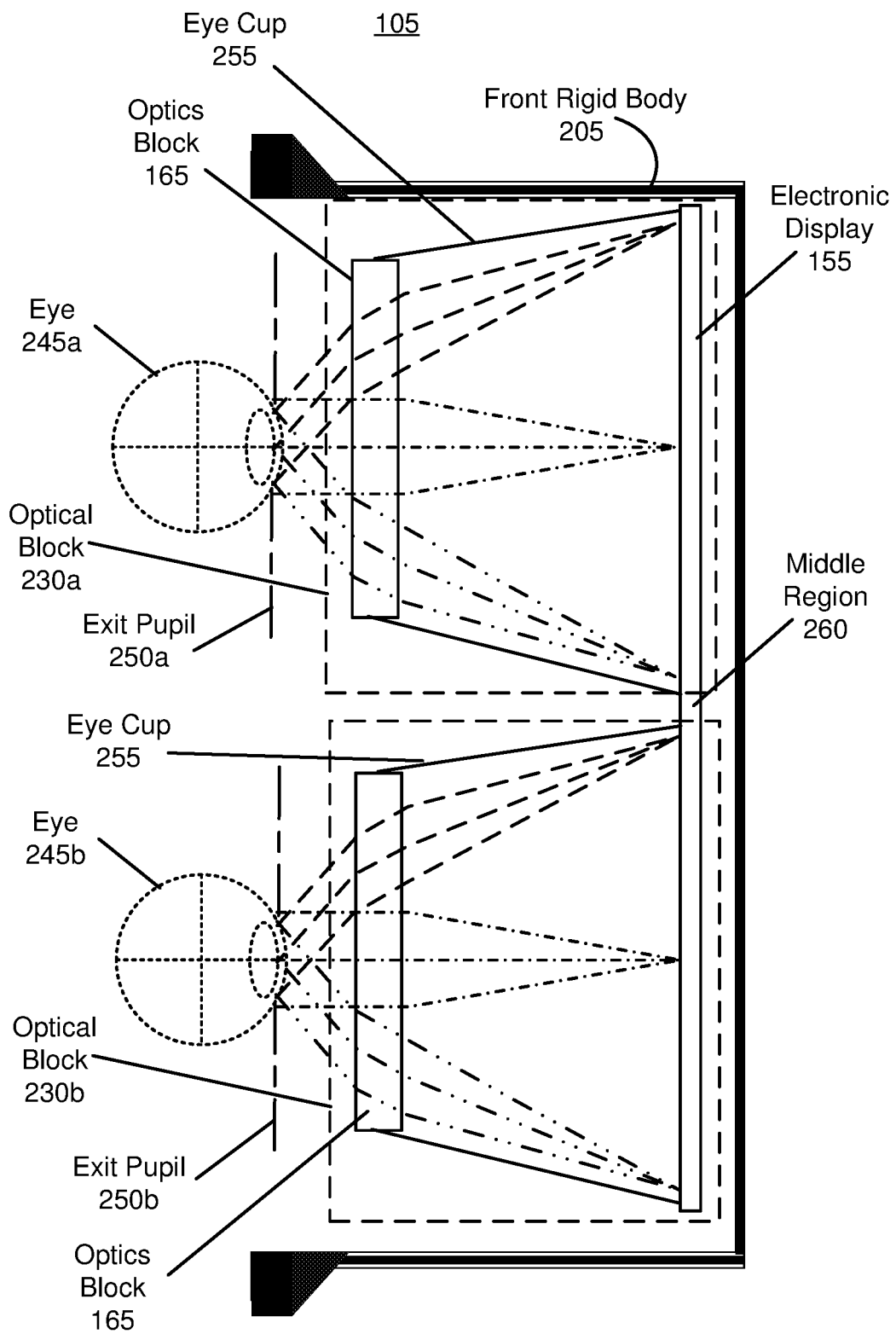
FIG. 3 shows a cross section of a front rigid body of the HMD in FIG. 2, in accordance with some embodiments.

FIG. 3 shows a cross section of the front rigid body 205 of the HMD 105 shown in FIG. 2. The front rigid body 205 includes the electronic display 155 and two optical blocks 230a and 230b. Each optical block 230a and 230b provides altered image light from the electronic display 155 to a respective exit pupil 250a and 250b. The exit pupil 250a is the location in the front rigid body 205 where a user's eye 245a is positioned, and the exit pupil 250b is the location where the user's other eye 245b is positioned.

The optical block 230a includes an optics block 165 and an eye cup 255. The eye cup 255 is mechanically secured with the front rigid body 205, and holds the optics block 165. The electronic display 155 emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250a for presentation to the user. In some embodiments, the optics block 165 and the eye cup 255 may be omitted from the optical block 230a or 230b. The discussion herein for the optical block 230a may be applicable to the optical block 230b, which also can include an optics block 165 and an eye cup 255 dedicated for the eye 245b.

The electronic display 155 is a single electronic display that emits image light for both the optical blocks 230a and 230. A middle region 260 of the electronic display 155 is defined between the optical blocks 230a and 230b. As discussed in greater detail below, the electronic display 155 can operate in a dual display mode, or selectively switch between a single display mode and the dual display mode. In the dual display mode, the pixels at the middle region 260 are inactive, and the middle region 260 separates the electronic display 155 into a left display portion and a right display portion. The dual display mode can provide different left and right channel VR, AR, or MR video to the viewer on a single electronic display. In the single display mode, the pixels at the middle region 260 are active, along with the rest of the pixels of the display panel. The entire display panel may be used as a single display portion, such as for displaying single channel video output.

Figure 4:
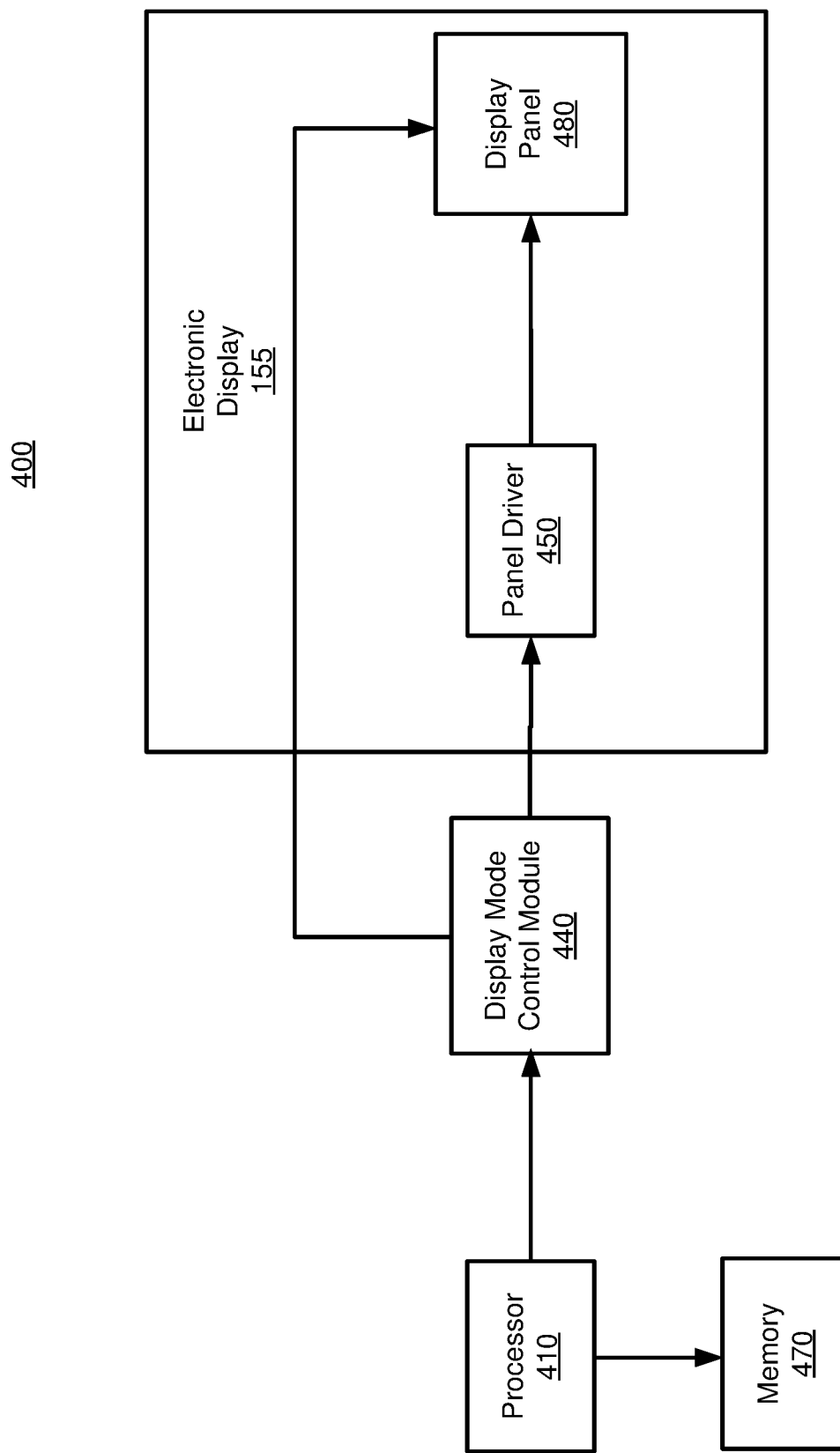
FIG. 4 shows a block diagram of system architecture for providing input data to a display panel, in accordance with some embodiments.

FIG. 4 shows a block diagram of system architecture 400 for providing input data to a display panel, in accordance with some embodiments. The system architecture 400 includes a processor 410 (or a host system), a display mode control module 440, an electronic display 155, and a memory 470. The electronic display 155 may utilize various types of display technologies such as liquid crystal display (LCD) or organic light emitting diode (OLED (e.g., active matrix OLED (AMOLED)). The electronic display 155 includes a panel driver 450, and a display panel 480. In some embodiments, the electronic display 155 is incorporated within the HMD 105. In other embodiments, the electronic display 155 may be part of some other electronic device, e.g., a mobile device, computer monitor, a television set, etc.

The processor 410 provides input data that is displayed on the display panel 480. The processor 410 may execute an application that generates the input data. Depending on the characteristics of the input data or application, the processor 410 may be configured to send a control signal to display mode control module 440 that specifies operation in the single display mode or dual display mode for the display panel 480. The display mode control module 440 may send a panel control signal to the display panel 480 that sets single display mode or dual display mode operation. In some embodiments, the processor 410 sends the panel control signal directly to the display panel 480. The memory 470 may be a non-transitory computer readable medium storing instructions that when executed by the processor 410 configures the processor 410 to perform the functionalities discussed herein for controlling the electronic display 155.

The display mode control module 440 receives the input data from the processor 410, and provides the input data to the panel driver 450 to drive the display panel 480. The panel driver 450 may be an integrated circuit that drives the pixels of the display panel 480. In some embodiments, the panel driver 450 may include a source driver ICs and a gate driver IC connected with a thin-film transistor (TFT) layer. The gate driver IC switches transistors of the TFT layer on or off, and the source driver IC provides data signals to the transistors. In some embodiments, the TFT layer is a gate-on-array (GAO) TFT layer that includes integrated gate transistor control. Here, the panel driver 450 includes a source driver IC that controls source and gate line connections to transistors of the TFT layer. The panel driver 450 and the display panel 480 may be integrated as parts of the electronic display 155.

FIG. 5A shows an example video frame 500 of input data for the display panel 480, in accordance with some embodiments. The video frame 500 is generated by the process 410 and provided to the electronic display 155 for display. The video frame 500 is defined by pixel data values for a matrix of pixels that collectively define a left pixel region 502 and a right pixel region 506. In dual display mode, the left pixel region 504 provides a left image channel for the left eye of the viewer and the right pixel region 506 provides a right image channel for the right eye of the viewer.

FIG. 5B shows an output of the display panel 480 in dual display mode for the video frame 500 of input data shown in FIG. 5A, in accordance with some embodiments. An inactive middle region 504 is defined between the left and right pixel regions 502 and 506. The middle region 504 provides a spatial separation for the left and right portions of the video frame 500 when output by the display panel 480. The middle region 504 is a region defined by multiple columns of inactive pixels that are unused when the video frame 500 is output on the display panel in dual display mode. Rather than rendering a (e.g., black colored) middle region with pixel data, the processor 410 provides smaller video frames of data by including only pixel data for the left and right pixel regions 502 and 506. As such, the bandwidth needed to send video frames from the processor 410 (e.g., the VR engine 145 of the console 120) to the electronic display 155 of the HMD 105 can be reduced. In some embodiments, the size of the middle region 504 may be adjustable to accommodate different interpupillary distance (IPD) of users.

Figure 6:
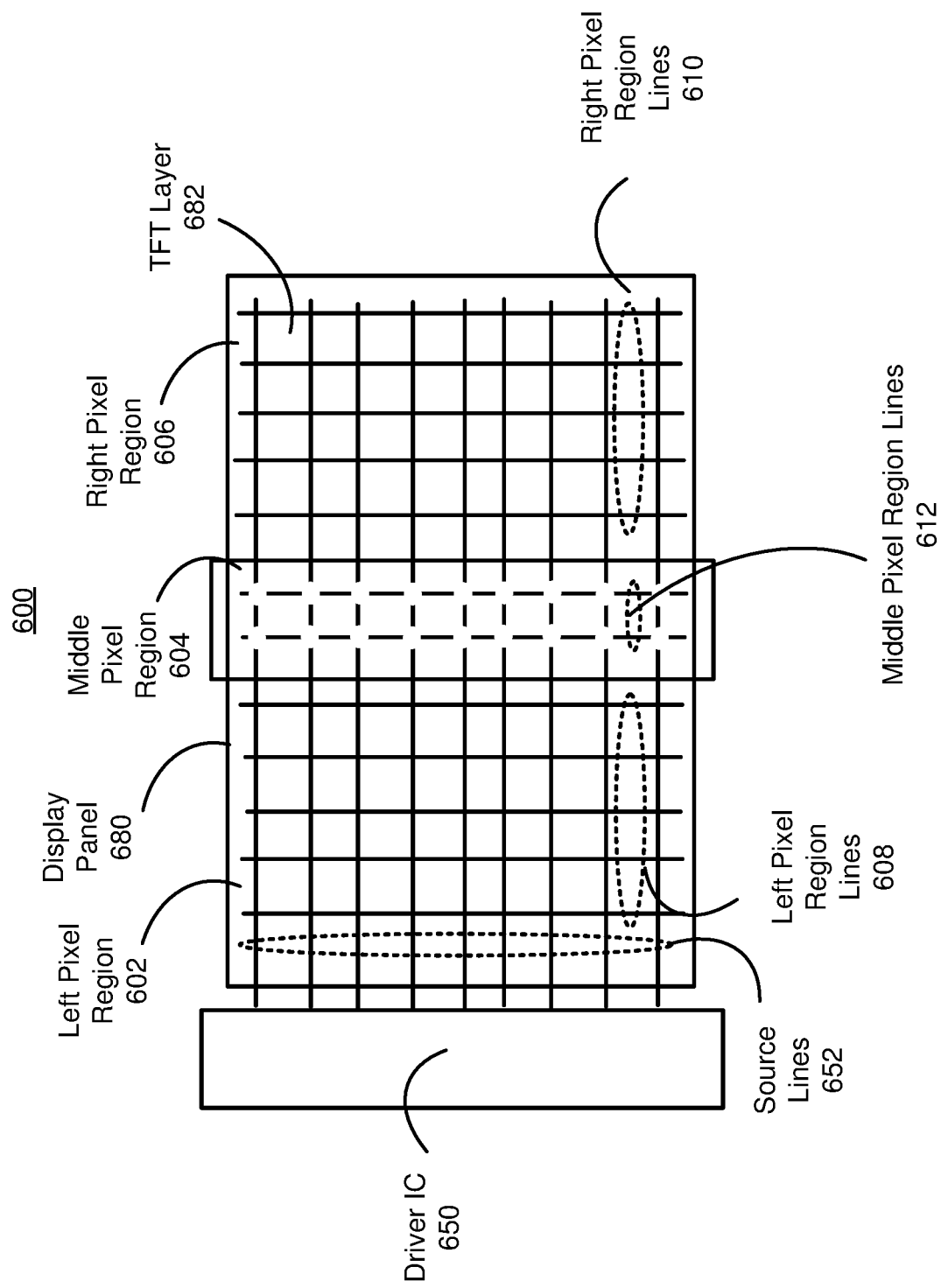
FIG. 6 is a schematic of an electronic display with dual display mode operation, in accordance with some embodiments.

FIG. 6 is a schematic of an electronic display 600 with dual display mode operation, in accordance with some embodiments. The electronic display 600 includes a display panel 680 and a driver IC (or "panel driver," as used herein) 650. The display panel 680 includes a (e.g., GAO) TFT layer 682 including transistors connected with pixels of a left pixel region 602, a middle pixel region 604, and a right pixel region 606. TFT layer 682 includes source lines 652, left pixel region (e.g., gate) lines 608, and right pixel region lines 610 that are connected with the transistors of the TFT layer 628 to drive the pixels. The source lines 652 carry source signals to the pixels and the pixel region lines (or "gate lines") 608 and 610 carry gate signals to the pixels. The sources lines 652 and the middle pixel region lines 612 are not connected with transistors of the TFT layer 682 at the middle pixel region 604, resulting in the middle pixel region 604 being an inactive area.

The driver IC 650 receives the input data (e.g., as shown in FIG. 5A), and provides signals to the active pixels of the left pixel region 602 and the right pixel region 606. The bandwidth and frame rate of the electronic display 155 is improved because there is no pixel data associated with the middle pixel region 604 that needs to be transmitted from the processor 410 to the driver IC 650 for each video frame. The data size of each video frame is reduced while maintaining a desired spatial separation between the left and right pixel regions on a single electronic display. Furthermore, a single driver IC 650 is used (e.g., rather than two separate driver ICs for left and right pixel regions 602 and 606), which can result in reduction of manufacturing cost and size of the display. In other embodiments, separate gate and driver ICs may be used to perform the functionality of the driver IC 650.

Figure 7:
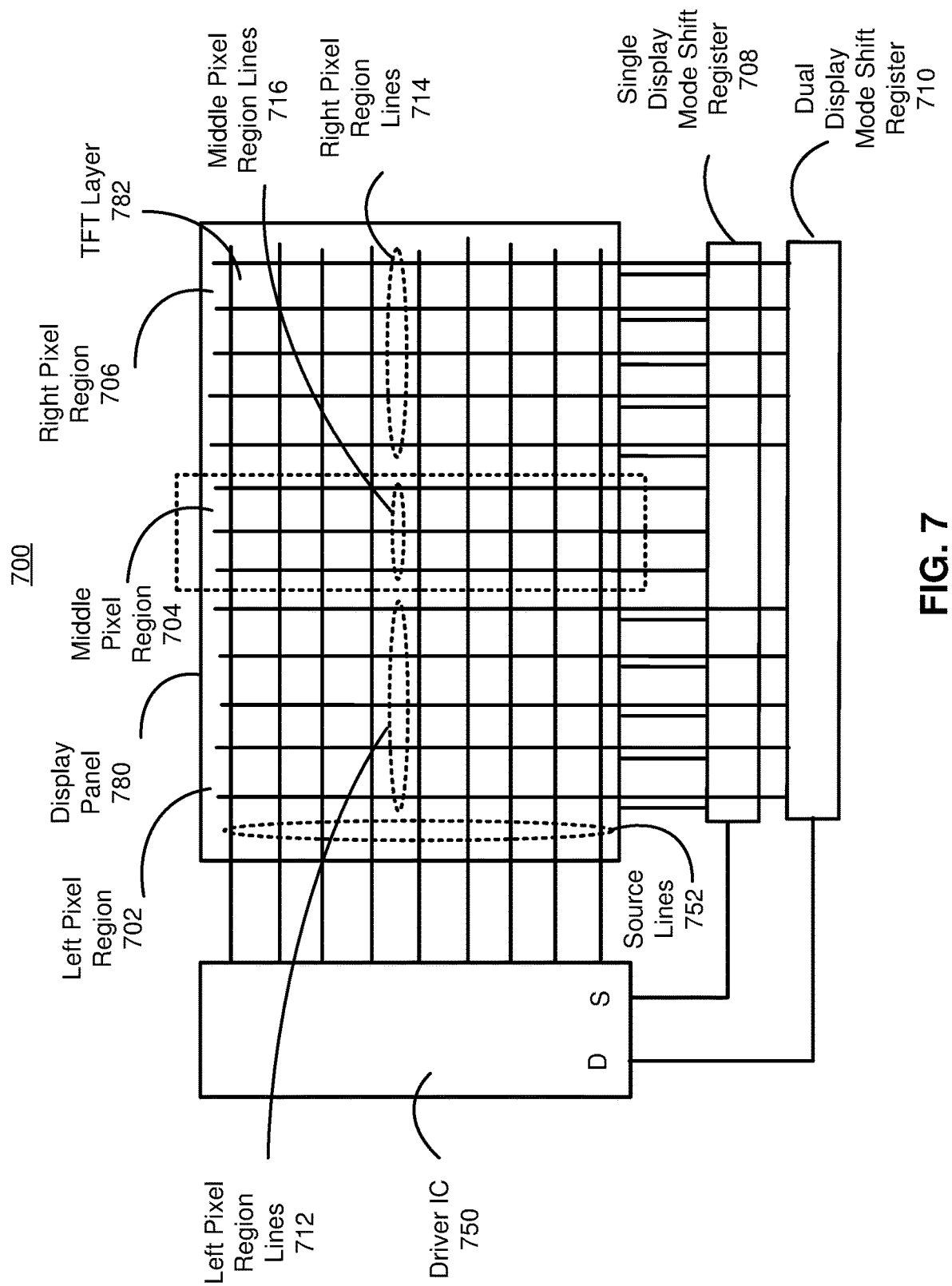
FIG. 7 shows a schematic of an electronic display with switchable single display mode and dual display mode operation, in accordance with some embodiments.

FIG. 7 shows a schematic of an electronic display 700 with switchable single display mode and dual display mode operation, in accordance with some embodiments. The electronic display 700 includes a display panel 780, a driver IC 750 (or "panel driver," as used herein) that supports switching between dual and single display modes, a single display mode shift register 708, and a dual display mode shift register 710. The display panel 780 includes a TFT layer 782 including transistors connected with pixels of a left pixel region 702, a middle pixel region 704, and a right pixel region 706.

The TFT layer 782 includes source lines 752, left pixel region (e.g., gate) lines 712, middle pixel region lines 716, and right pixel region lines 714. The source lines 752 carry source signals to the pixels and the pixel region lines (or "gate lines") 712, 714, and 716 carry gate signals to the pixels. Unlike the TFT layer 682 shown in FIG. 6, the transistors of the TFT layer 782 are connected with the source lines and gate lines in the middle pixel region 704, resulting in the middle pixel region 704 being selectively an active area or an inactive area. Each of the single display mode shift register 708 and the dual display mode shift register 710 may include a cascade of flip-flops. The single display mode shift register 708 has a flip-flop for each of the pixel region lines 712, 714, and 716. The dual display mode shift register 710 is smaller than the single display mode shift register 708. For example, the dual display mode shift register 708 can include a flip-flop for the left pixel region lines 712 followed by flip-flops for the right pixel region lines 714.

The driver IC 750 is connected with the single display mode shift register 708 and the dual display mode shift register 710. The single display mode shift register 708 is connected with each of the left pixel region lines 712, middle pixel region lines 714, and right pixel region lines 714. The dual display mode shift register 710 is connected with the left pixel region lines 712 and the right pixel region lines 714, but not the middle pixel region lines 716. As such, the middle pixel region 704 becomes an inactive area when using the dual display mode shift register 710.

The driver IC 750 uses the single display mode shift register 708 to provide gate signals of larger (e.g., full) resolution video frames of input data to the display panel 780, and uses the dual display mode shift register 710 to provide smaller resolution video frames (e.g., video frame 500 shown in FIG. 5A) to the display panel 780. The driver IC 750 may include a switch that selectively outputs gate signals to either the single display mode shift register 708 (S) or the dual display mode shift register 710 (D). The switch may be controlled by a panel control signal from the display mode control module 440 or the processor 410. In some embodiments, the driver IC 750 switches between the dual display mode and the single display mode based on the resolution size of input data received by the driver IC 750. For example, full resolution input data may be output in the single display mode, while smaller sized input data may be output in the dual display mode.

Figure 8:
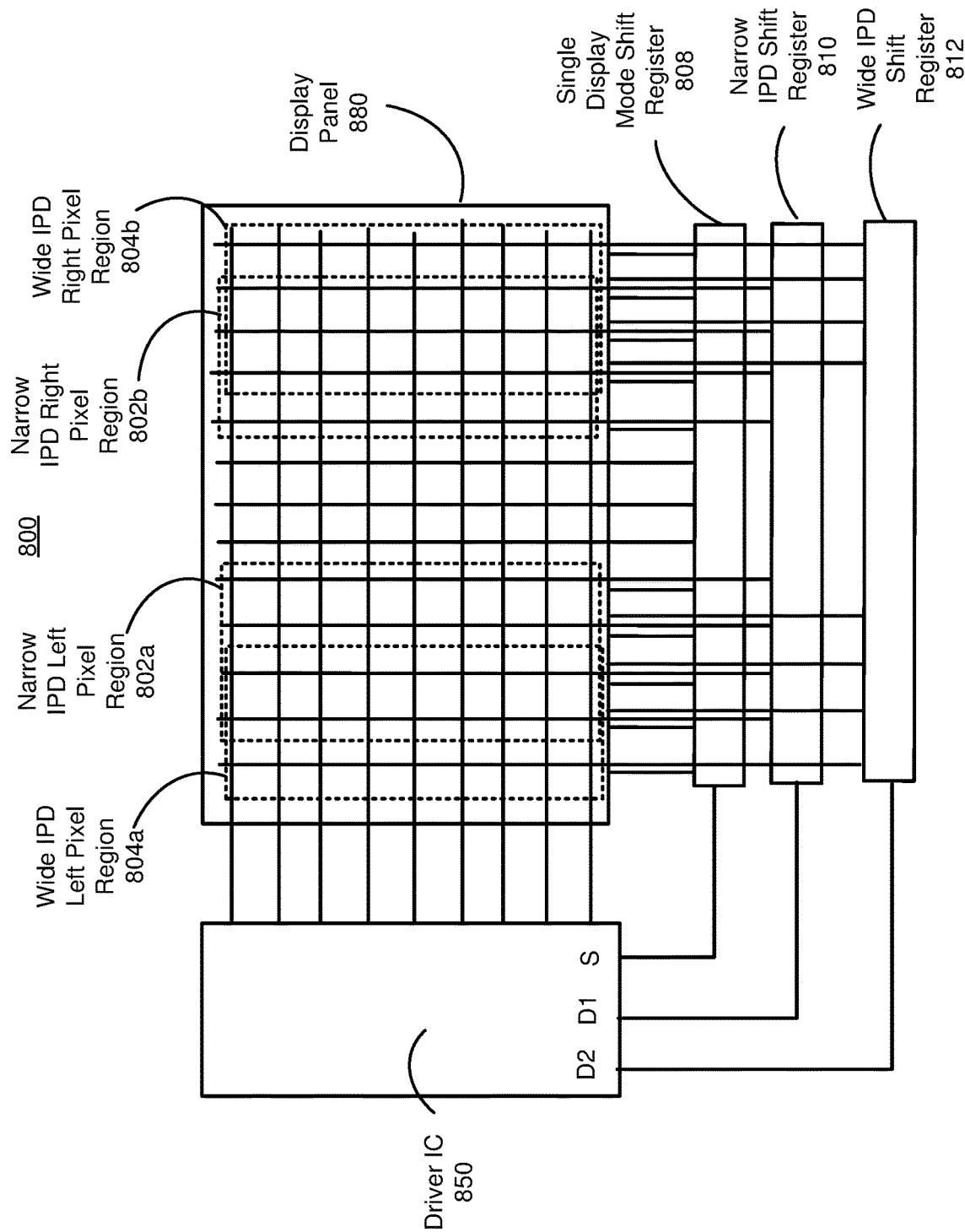
FIG. 8 shows a schematic of an electronic display with multiple dual display modes for different interpupillary distances (IPDs), in accordance with some embodiments.

FIG. 8 shows a schematic of an electronic display 800 with multiple dual display modes for different interpupillary distance (IPD), in accordance with some embodiments. The electronic display 800 can be switched between multiple dual display mode shift registers, such as a narrow IPD shift register 810 and a wide IPD shift register 812. The narrow IPD shift register 810 provides a narrow IPD dual display mode output and the wide IPD shift register 812 provides a wide IPD dual display mode output. The electronic display 800 also includes a single display shift register 808 for the single display mode. A driver IC 850 is connected with the single display mode shift register 808, the narrow IPD shift register 810, and the wide IPD shift register 812.

The narrow IPD shift register 810 and the wide IPD shift register 812 are connected with different sets of pixel (e.g., gate) lines to define different active and inactive regions on the display panel. For example, the narrow IPD shift register 810 is connected with lines of narrow IPD left pixel region 802a and narrow IPD right pixel region 802b. The wide IPD shift register 812 is connected with lines of wide IPD left pixel region 804a and wide IPD right pixel region 804b. The narrow IPD left pixel region 802a and narrow IPD right pixel region 802b define a narrow middle region in between the regions 802a and 802b, while the wide IPD left pixel region 804a and wide IPD right pixel region 804b define a wider middle region in between the regions 804a and 804b. When the narrow IPD regions 802a and 802b are used, there may be inactive peripheral regions at the left and right edges in addition to the inactive middle region.

The driver IC 850 may include a switch that selectively outputs gate signals to either the single display mode shift register 808 (S), the dual display mode narrow IPD shift register 810 (D1), or the dual display mode wide IPD shift register 812 (D2). The switch may be controlled by a panel control signal from the display mode control module 440 or the processor 410. The switch may send gate signals to a particular register based on the resolution of input data. For example, higher resolution input data may result in use of the single display mode, while lower resolution input data may result in use the narrow IPD dual display mode or the wide IPD dual display mode.

The electronic display 800 provides for adjustment to accommodate variance in user IPD. Although the display 800 is configured to provide two defined IPD positions (or clicks), the electronic display can be configured to provide any number of predefined positions of different IPD. In another example, the electronic display 800 provides for three defined positions. For example, the display may include a third dual display mode shift register, connected with lines of left and right pixel regions to define a third IPD that is wider than the IPD of the wide IPD shift register 812. The width of the middle region IPD for each shift register can be set based on the connection of flip-flops to lines of the TFT layer. The three defined IPD positions may include a narrow IPD, a standard or nominal IPD, and a wide IPD.

Figure 9A:
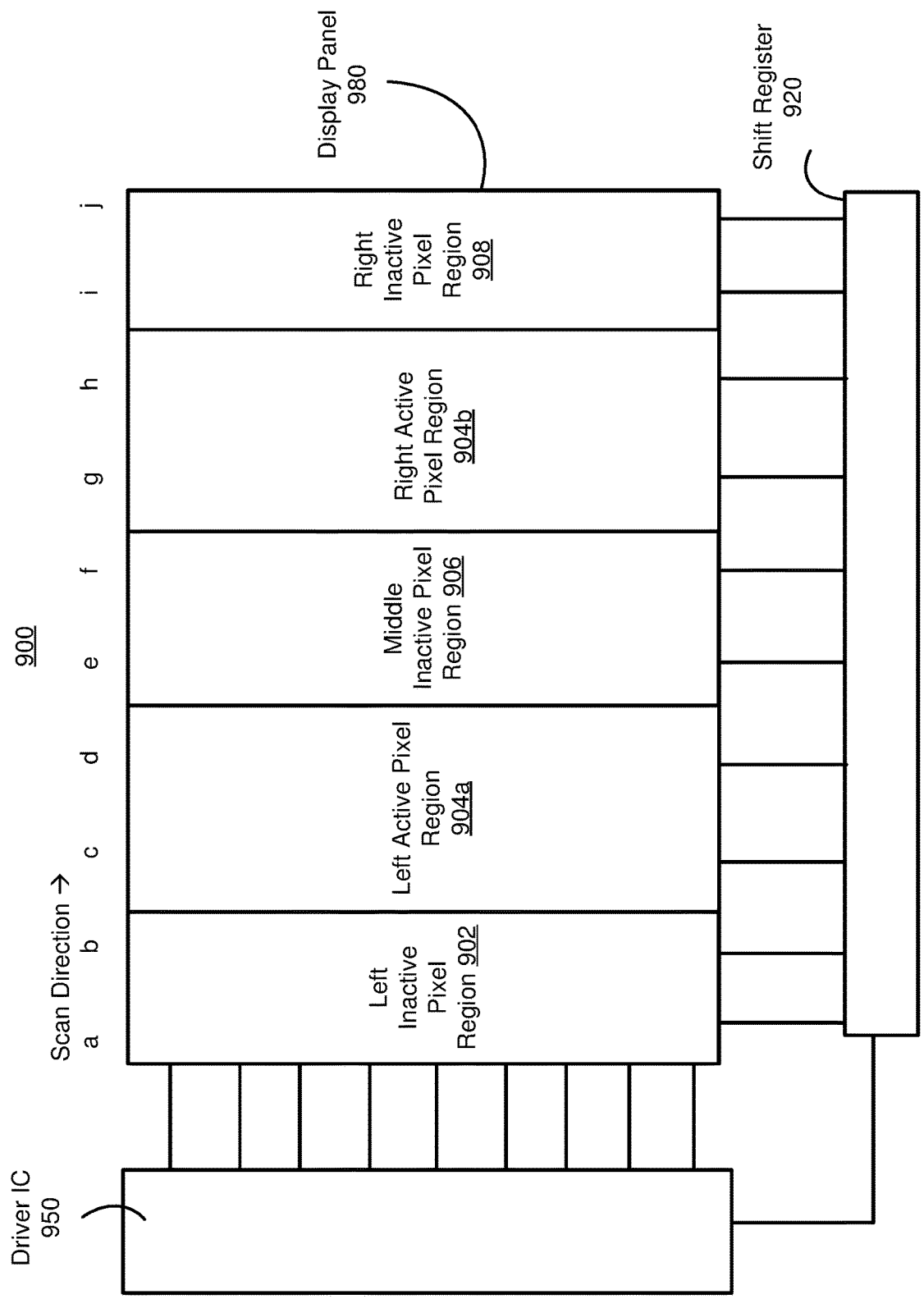
FIGS. 9A through 9C show schematics of an electronic display with a switchable TFT layer for different IPDs, in accordance with some embodiments.
Figure 9B:
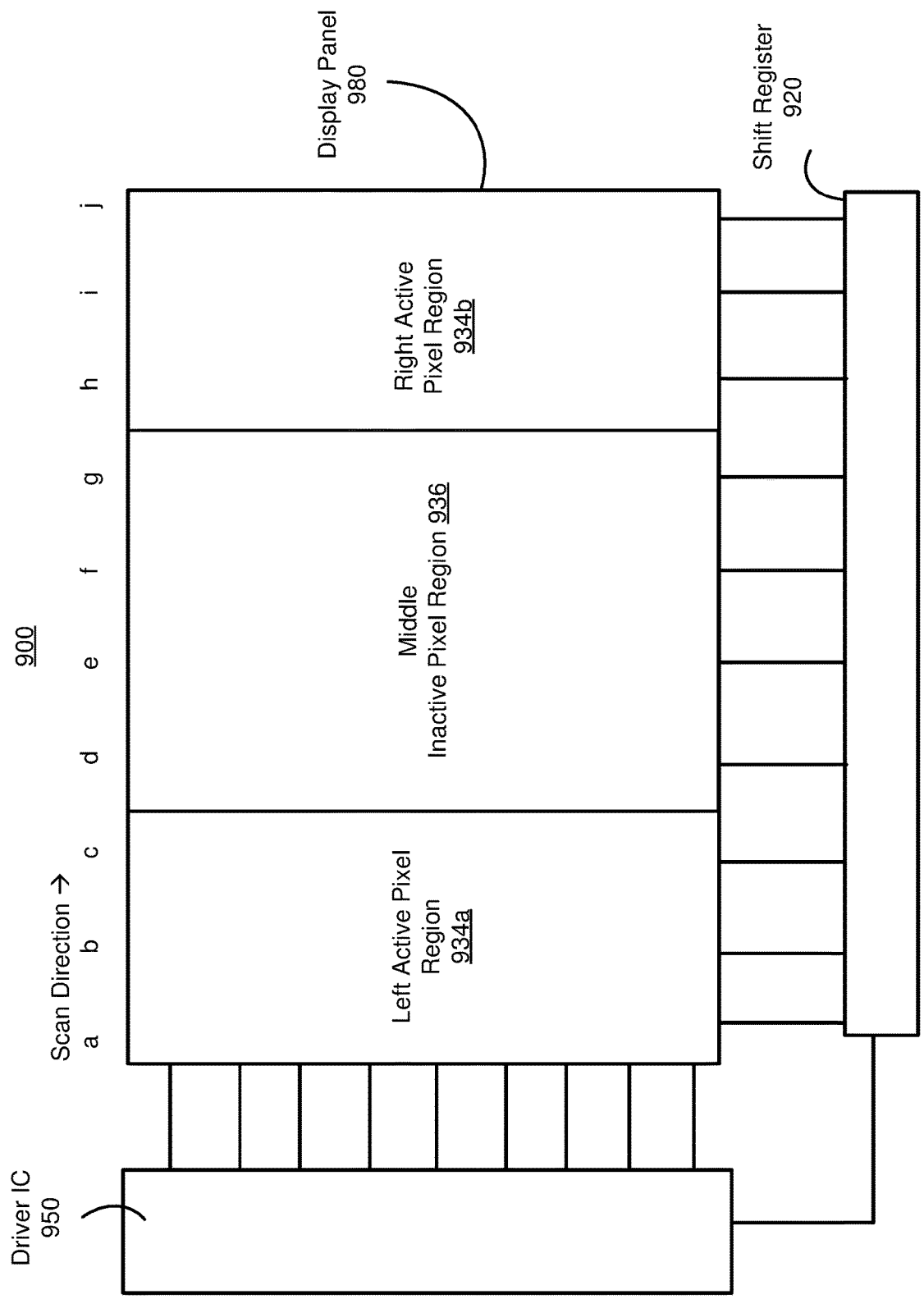
Figure 9C:
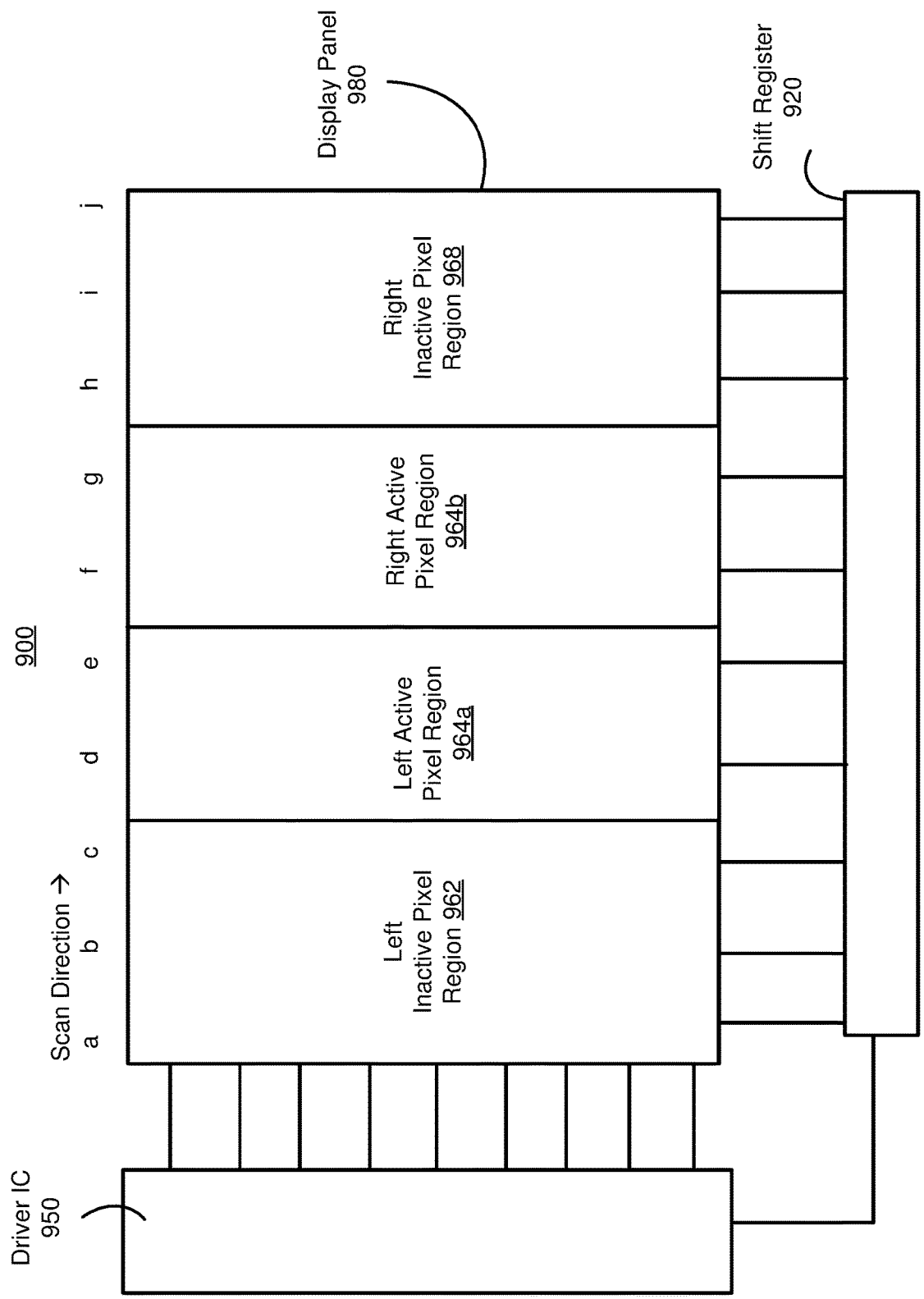

FIGS. 9A through 9C show schematics of an electronic display 900 with multiple dual display modes for different interpupillary distance (IPD), in accordance with some embodiments. With reference to FIG. 9A, the electronic display 900 provides for multiple IPD outputs by setting TFT switches of a TFT layer of the display panel 980. The electronic display 900 includes the display panel 980, a driver IC 950, and a shift register 920. The shift register 920 is connected with each of the pixel column lines, and is configurable to provide dual display mode operation for multiple IPDs by controlling TFT switches (which can be set ON/OFF by register settings in driver IC 950) of the TFT layer of the display panel 980. The TFT switches set defined pixel portions of the display panel 980 as active pixel regions and inactive pixel regions. The selection of pixel portions for each of the active and inactive pixel regions can be chosen to create a nominal IPD mode, a narrow IPD mode, and a wide IPD mode. For example, the TFT switches for various pixel lines a through j shown in FIG. 9 can be used to set inactive and active regions. Although ten pixel lines a through j are shown and discussed herein to avoid overcomplicating the disclosure, the electronic display 900 may include additional pixel lines. For example, each pixel line a through j may represent multiple pixel lines having a shared switching control scheme.

FIG. 9A shows a standard or nominal IPD mode having a left active pixel region 904a, as set by pixel lines c and d, and a right active pixel region 904b, as set by pixel lines g and h. The pixel lines e and f set a middle inactive pixel region 906 to provide the nominal IPD distance between left and right channel displays. The pixel lines a and b set a left inactive pixel region 902, and the pixel lines i and j set a right inactive pixel region 908.

FIG. 9B shows a wide IPD mode of the electronic display 900 having a left active pixel region 934a, as set by pixel lines a through c, and a right active pixel region 903b, as set by pixel lines h through j. The pixel lines d through g set a middle inactive pixel region 936 to provide the wide IPD between left and right channel displays.

FIG. 9C shows a narrow IPD mode of the electronic display 900 having a left active pixel region 964a, as set by pixel lines d and e, and a right active pixel region 964b, as set by pixel lines f and g. In this narrow IPD mode, the left and right active pixel regions 964 and 964b are not separated by an inactive middle pixel region. In other examples, a middle pixel region can be used in the narrow IPD mode that is narrower than the size of the middle pixel region 906 of the nominal IPD mode. The pixel lines a through c set a left inactive pixel region 962, and the pixel lines h through j set a right inactive pixel region 968.

With reference to FIGS. 9A through 9C, the left active pixel regions 904a, 934a, and 964a may have the same size, and the right active pixel regions 904b, 934b, and 964b may have the same size such that the same video frame can be output in the nominal, wide, or narrow IPDs by the electronic display 900. In some embodiments, the processor 410 sends a panel control signal to the driver IC 950 that sets IPD mode. Although electronic display 900 is discussed as having three IPD modes, two or more different IPD modes may be used in various embodiments to provide adjustable IPD.

Figure 10:
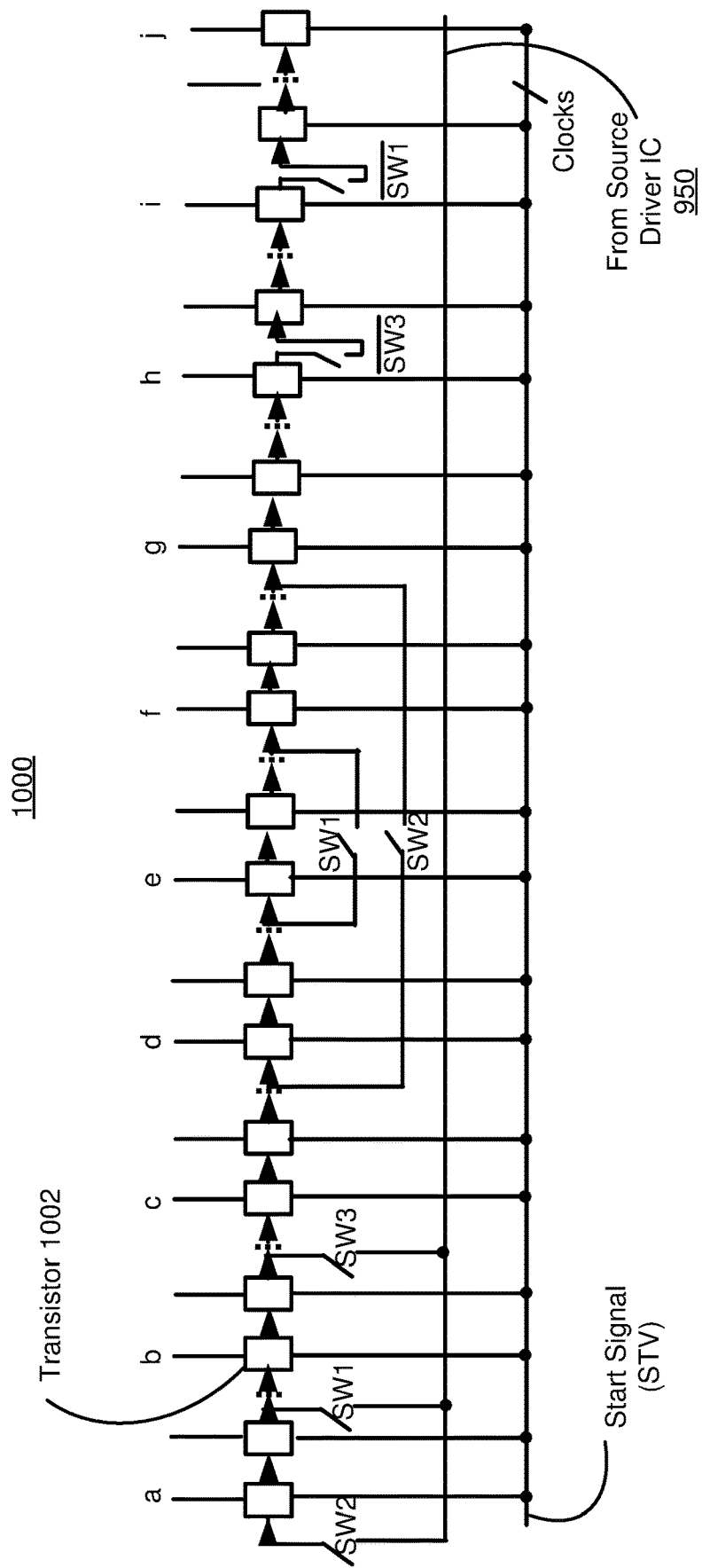
FIG. 10 shows a schematic of a switchable TFT layer of the electronic display, in accordance with some embodiments.

FIG. 10 shows a schematic of a switchable TFT layer 1000 of the electronic display 900, in accordance with some embodiments. The TFT layer 1000 includes switches SW1, SW2, and SW3 that control the transistors 1002 of the TFT layer to operate in the nominal, wide, and narrow IPD modes. For nominal IPD mode, only SW1 is switched ON, for wide IPD mode only SW2 is switched ON, for narrow IPD mode only SW3 is switched ON. As such, the switching of the transistors 1002, which may be controlled by the driver IC 950 sets different IPD modes for the electronic display.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A head-mounted display (HMD), comprising:
   an electronic display, including:
      a display panel including a left pixel region, a right pixel region, and a middle pixel region between the left and right pixel regions; and
      a panel driver coupled to the display panel, the driver configured to:
         in a single display mode of the electronic display, provide first gate signals generated from first input data to the left, right, and middle pixel regions; and
         in a dual display mode of the electronic display, provide second gate signals generated from second input data to the left and right pixel regions, the middle pixel region being inactive in the dual display mode, the first input data having a first resolution that is larger than a second resolution of the second input data.

2. The HMD of claim 1, wherein the electronic display further includes a single display mode shift register coupled to the panel driver and pixel lines of the left, right, and middle pixel regions, the single display mode shift register configured to provide the first gate signals from the panel driver to the pixel lines of the left, right, and middle pixel regions in the single display mode of the electronic display.

3. The HMD of claim 2, wherein the electronic display further includes a dual display mode shift register coupled to the panel driver and pixel lines of the left and right pixel regions, the dual display mode shift register configured to provide the second gate signals from the panel driver to the pixel lines of the left and right pixel regions in the dual display mode of the electronic display.

4. The HMD of claim 2, further comprising:
   a processor configured to generate input data and a control signal specifying operation of the display panel in the single display mode or the dual display mode; and
   a display mode control module configured to:
      send the input data as the first input data to the single display mode shift register when the control signal specifies operation of the display panel in the single display mode; and
      send the input data as the second input data to the dual display mode shift register when the control signal specifies operation of the display panel in the dual display mode.

5. The HMD of claim 2, wherein:
the dual display mode includes a narrow interpupillary distance (IPD) dual display mode and a wide IPD dual display mode; and
the electronic display further includes:
  a narrow IPD shift register coupled to the panel driver and a first set of pixel lines of a narrow IPD left pixel region of the left pixel region and a narrow IPD right pixel region of the right pixel region, the narrow IPD shift register configured to provide the second gate signals from the panel driver to the first set of pixel lines of the narrow IPD left pixel region and the narrow IPD right pixel region in the narrow IPD dual display mode of the electronic display; and
  a wide IPD shift register coupled to the panel driver and a second set of pixel lines of a wide IPD left pixel region of the left pixel region and a wide IPD right pixel region of the right pixel region, the wide IPD shift register configured to provide the second gate signals from the panel driver to the second set of pixel lines of the wide IPD left pixel region and the wide IPD right pixel region in the wide IPD dual display mode of the electronic display.

6. The HMD of claim 5, wherein:
the narrow IPD left pixel region and the narrow IPD right pixel region defines a narrow middle region of the display panel between the narrow IPD left pixel region and the narrow IPD right pixel region; and
the wide IPD left pixel region and the wide IPD right pixel region defines a wide middle region of the display panel between the wide IPD left pixel region and the wide IPD right pixel region that is wider than the narrow middle region.

7. The HMD of claim 5, further comprising:
a processor configured to generate input data and a control signal specifying operation of the display panel in the single display mode, the narrow IPD dual display mode, or the wide IPD dual display mode; and
a display mode control module configured to:
  send the input data as the first input data to the single display mode shift register when the control signal specifies operation of the display panel in the single display mode;
  send the input data as the second input data to the narrow IPD shift register when the control signal specifies operation of the display panel in the narrow IPD dual display mode; and
  send the input data as the second input data to the wide IPD shift register when the control signal specifies operation of the display panel in the dual display mode.

8. The HMD of claim 1, wherein the panel driver is configured to provide source signals to the left, right, and middle pixel regions of the display panel.

9. The HMD of claim 1, wherein the display panel further includes light emitting diodes (LEDs) that form pixels of the left pixel region, the right pixel region, and the middle pixel region.

10. The HMD of claim 1, further comprising a first optics block positioned to receive first light from the left pixel region and a second optics block positioned to receive second light from the right pixel region.

11. An electronic display, comprising:
a display panel including a left pixel region, a right pixel region, and a middle pixel region between the left and right pixel regions; and
a panel driver coupled to the display panel, the driver configured to:
  in a single display mode of the electronic display, provide first gate signals generated from first input data to the left, right, and middle pixel regions; and
  in a dual display mode of the electronic display, provide second gate signals generated from second input data to the left and right pixel regions, the middle pixel region being inactive in the dual display mode, the first input data having a first resolution that is larger than a second resolution of the second input data.

12. The electronic display of claim 11, further including a single display mode shift register coupled to the panel driver and pixel lines of the left, right, and middle pixel regions, the single display mode shift register configured to provide the first gate signals from the panel driver to the pixel lines of the left, right, and middle pixel regions in the single display mode of the electronic display.

13. The electronic display of claim 12, further including a dual display mode shift register coupled to the panel driver and pixel lines of the left and right pixel regions, the dual display mode shift register configured to provide the second gate signals from the panel driver to the pixel lines of the left and right pixel regions in the dual display mode of the electronic display.

14. The electronic display of claim 12, wherein:
the dual display mode includes a narrow interpupillary distance (IPD) dual display mode and a wide IPD dual display mode; and
the electronic display further includes:
  a narrow IPD shift register coupled to the panel driver and a first set of pixel lines of a narrow IPD left pixel region of the left pixel region and a narrow IPD right pixel region of the right pixel region, the narrow IPD shift register configured to provide the second gate signals from the panel driver to the first set of pixel lines of the narrow IPD left pixel region and the narrow IPD right pixel region in the narrow IPD dual display mode of the electronic display; and
  a wide IPD shift register coupled to the panel driver and a second set of pixel lines of a wide IPD left pixel region of the left pixel region and a wide IPD right pixel region of the right pixel region, the wide IPD shift register configured to provide the second gate signals from the panel driver to the second set of pixel lines of the wide IPD left pixel region and the wide IPD right pixel region in the wide IPD dual display mode of the electronic display.

15. The electronic display of claim 14, wherein:
the narrow IPD left pixel region and the narrow IPD right pixel region defines a narrow middle region of the display panel between the narrow IPD left pixel region and the narrow IPD right pixel region; and
the wide IPD left pixel region and the wide IPD right pixel region defines a wide middle region of the display panel between the wide IPD left pixel region and the wide IPD right pixel region that is wider than the narrow middle region.

16. The electronic display of claim 11, wherein the panel driver is configured to provide source signals to the left, right, and middle pixel regions of the display panel.

17. The electronic display of claim 11, wherein the display panel further includes light emitting diodes (LEDs) that form pixels of the left pixel region, the right pixel region, and the middle pixel region.

18. A system, comprising:
an electronic display, including:
- a display panel including a left pixel region, a right pixel region, and a middle pixel region between the left and right pixel regions; and
- a panel driver coupled to the display panel, the driver configured to:
  - in a single display mode of the electronic display, provide first gate signals generated from first input data to the left, right, and middle pixel regions; and
  - in a dual display mode of the electronic display, provide second gate signals generated from second input data to the left and right pixel regions, the middle pixel region being inactive in the dual display mode, the first input data having a first resolution that is larger than a second resolution of the second input data; and a console connected to the electronic display, the console configured to generate the first and second input data and provide the first and second input data to the panel driver.

19. The system of claim 18, wherein the electronic display further includes:
- a single display mode shift register coupled to the panel driver and pixel lines of the left, right, and middle pixel regions, the single display mode shift register configured to provide the first gate signals from the panel driver to the pixel lines of the left, right, and middle pixel regions in the single display mode of the electronic display; and
- a dual display mode shift register coupled to the panel driver and pixel lines of the left and right pixel regions, the dual display mode shift register configured to provide the second gate signals from the panel driver to the pixel lines of the left and right pixel regions in the dual display mode of the electronic display.

20. The system of claim 19, wherein:
the dual display mode includes a narrow interpupillary distance (IPD) dual display mode and a wide IPD dual display mode; and
the electronic display further includes:
- a single display mode shift register coupled to the panel driver and pixel lines of the left, right, and middle pixel regions, the single display mode shift register configured to provide the first gate signals from the panel driver to the pixel lines of the left, right, and middle pixel regions in the single display mode of the electronic display;
- a narrow IPD shift register coupled to the panel driver and a first set of pixel lines of a narrow IPD left pixel region of the left pixel region and a narrow IPD right pixel region of the right pixel region, the narrow IPD shift register configured to provide the second gate signals from the panel driver to the first set of pixel lines of the narrow IPD left pixel region and the narrow IPD right pixel region in the narrow IPD dual display mode of the electronic display; and
- a wide IPD shift register coupled to the panel driver and a second set of pixel lines of a wide IPD left pixel region of the left pixel region and a wide IPD right pixel region of the right pixel region, the wide IPD shift register configured to provide the second gate signals from the panel driver to the second set of pixel lines of the wide IPD left pixel region and the wide IPD right pixel region in the wide IPD dual display mode of the electronic display.

* * * * *